(12) United States Patent
Willis et al.

(10) Patent No.: US 7,362,884 B2
(45) Date of Patent: Apr. 22, 2008

(54) MULTIMODAL BIOMETRIC ANALYSIS

(75) Inventors: William Frederic Willis, Laguna Niguel, CA (US); Johann Herbert Lau, Escondido, CA (US); Daniel Dlab, Ottawa (CA)

(73) Assignee: ImageWare Systems, Inc., San Diego, CA (US)

( * ) Notice: Subject to any disclaimer, the term of this patent is extended or adjusted under 35 U.S.C. 154(b) by 14 days.

(21) Appl. No.: 11/378,015

(22) Filed: Mar. 17, 2006

(65) Prior Publication Data

US 2006/0210119 A1    Sep. 21, 2006

Related U.S. Application Data

(60) Provisional application No. 60/663,310, filed on Mar. 17, 2005.

(51) Int. Cl.
*G06K 9/00* (2006.01)
*G06F 7/00* (2006.01)

(52) U.S. Cl. .......................... 382/116; 340/5.82; 902/3

(58) Field of Classification Search .................. None
See application file for complete search history.

(56) References Cited

U.S. PATENT DOCUMENTS

| | | | |
|---|---|---|---|
| 6,289,112 B1 | 9/2001 | Jain et al. | |
| 6,393,139 B1 | 5/2002 | Lin et al. | |
| 6,751,733 B1 | 6/2004 | Nakamura et al. | |
| 2003/0031348 A1* | 2/2003 | Kuepper et al. | 382/116 |
| 2004/0243567 A1 | 12/2004 | Levy | |
| 2005/0138391 A1 | 6/2005 | Mandalia et al. | |
| 2005/0265607 A1 | 12/2005 | Chang | |
| 2006/0171571 A1* | 8/2006 | Chan et al. | 382/115 |
| 2006/0260988 A1* | 11/2006 | Schneider et al. | 209/583 |

OTHER PUBLICATIONS

Abstract of Japanese patent application JP2003178031 (English translation).
Informational brochure entitled "IWS Biometric Engine", ImageWare® Systems, Inc., copyright 1999-2004, pp. 1-4.

(Continued)

*Primary Examiner*—Bhavesh M. Mehta
*Assistant Examiner*—Charles Kim
(74) *Attorney, Agent, or Firm*—Townsend and Townsend and Crew, LLP

(57) ABSTRACT

A biometric system that uses readings from a plurality of biometrics of a user is disclosed. The biometric system includes a first and second biometric readers, a first and second biometric matching engines and a processor. The first biometric reader producing a first measured biometric that is processed by the first biometric matching engine to deliver a first value, which is indicative of a likelihood that the first measured biometric matches a first stored biometric reading. A plurality of first values are gathered prior to the first value. The second biometric reader delivers a second measured biometric for processing by the second biometric matching engine to produce a second value, which is indicative of a likelihood that the second measured biometric matches a second stored biometric reading. A plurality of second values are gathered prior to the second value. The first and second biometric readers measure a different biometric, or the first and second biometric matching engines use a different algorithm. The processor normalizes the first value according to the plurality of first values, normalizes the second value according to the plurality of second values, and determines if the user matches a person using the normalized first and second values.

18 Claims, 6 Drawing Sheets

OTHER PUBLICATIONS

Ross, A., et al. "Multimodal Biometrics: An Overview", *Proc of 12th European Signal Processing Conference (EUSIPCO)* (Vienna, Austria) 2004:1221-1224.

Jain, Anil K., et al. "Multibiometric Systems", *Communications of the ACM, Special Issue on Multimodal Interfaces*, (2004) 47(1):34-40.

Indovina, M. et al. "Multimodal Biometric Authentication Methods: A COTS Approach", *Proc. MMUA 2003, Workshop on Multimodal User Authentication*, Santa Barbara, CA, Dec. 11-12, 2003, pp. 99-106.

Wang, Y., et al. "Combining Face and Iris Biometrics for Identity Verification", *Proc. of 4th Int'l Conf. on Audio- and Video-Based Biometric Person Authentication (AVBPA)*, Guilford, UK, Jun. 9-11, 2003, pp. 805-813.

Kumar, A., et al. "Personal Verification Using Palmprint and Hand Geometry Biometric", *Proc. of 4th Int'l Conf. on Audio- and Video-Based Biometric Person Authentication (AVBPA)*, Guilford, UK, Jun. 9-11, 2003, pp. 668-678.

Ross, A., et al. "Information Fusion in Biometrics", *Pattern Recognition Letters*, (2003) 24(13):2115-2125.

Jain, A. K., et al. "Learning User-specific Parameters in a Multibiometric System", *Proc. International Conference on Image Processing (ICIP)*, Rochester, NY, Sep. 22-25, 2002, pp. 57-60.

Ross, A., et al. "Information Fusion in Biometrics", *Proc. 3rd International Conference on Audio-and Video-Based Person Authentication (AVBPA)*, Sweden, Jun. 6-8, 2001, pp. 354-359.

\* cited by examiner

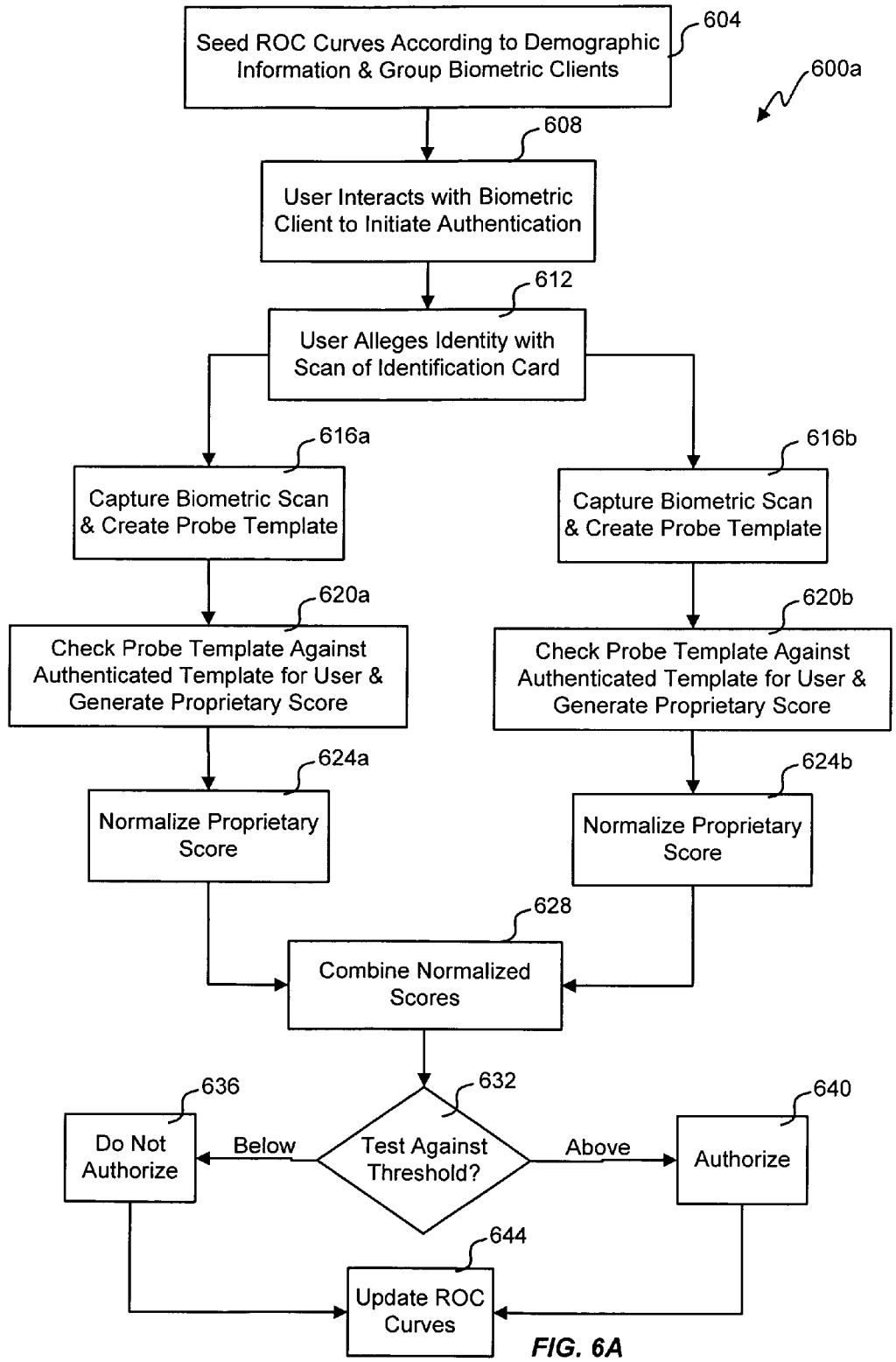

MULTIMODAL BIOMETRIC ANALYSIS

This application claims the benefit of and is a non-provisional of U.S. Provisional Application Ser. No. 60/663,310 filed on Mar. 17, 2005, which is assigned to the assignee hereof and hereby expressly incorporated by reference in its entirety for all purposes.

BACKGROUND OF THE INVENTION

The present invention relates generally the field of biometric identification and authentication, and more particularly to a multimodal biometric system and method.

Biometric matching has problems with accuracy. Biometrics are used to gain access to controlled areas and for other authentication purposes. There are different types of biometric readers that measure some different unique characteristic of a user. There are different algorithms to analyze the measured characteristic and match it. Each type of reader and algorithm has problems with accuracy.

Counter terrorism measures are often premised on authenticating a person's identity. There are biometric face scanners and entry point biometric readers to identify those who may wish to perform terrorist acts before they can complete their plan. False positives or negatives of biometric systems can cause serious problems. Where a false positive occurs, someone might be flagged as a terrorist who is not. A false negative could result in failure to identify a terrorist.

SUMMARY

In one embodiment, the present disclosure provides a biometric system that uses readings from a plurality of biometrics of a user is disclosed. The biometric system includes a first and second biometric readers, a first and second biometric matching engines and a processor. The first biometric reader deliver a first measured biometric that is processed by the first biometric matching engine to produce a first value, which is indicative of a likelihood that the first measured biometric matches a first stored biometric reading. A plurality of first values are gathered prior to the first value. The second biometric reader delivers a second measured biometric for processing by the second biometric matching engine to produce a second value, which is indicative of a likelihood that the second measured biometric matches a second stored biometric reading. A plurality of second values are gathered prior to the second value. The first and second biometric readers measure a different biometric, or the first and second biometric matching engines use a different algorithm. The processor normalizes the first value according to the plurality of first values, normalizes the second value according to the plurality of second values, and determines if the user matches a person using the normalized first and second values.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 6A and 6B are embodiments of a flowchart for biometric matching process.

Figure 1:
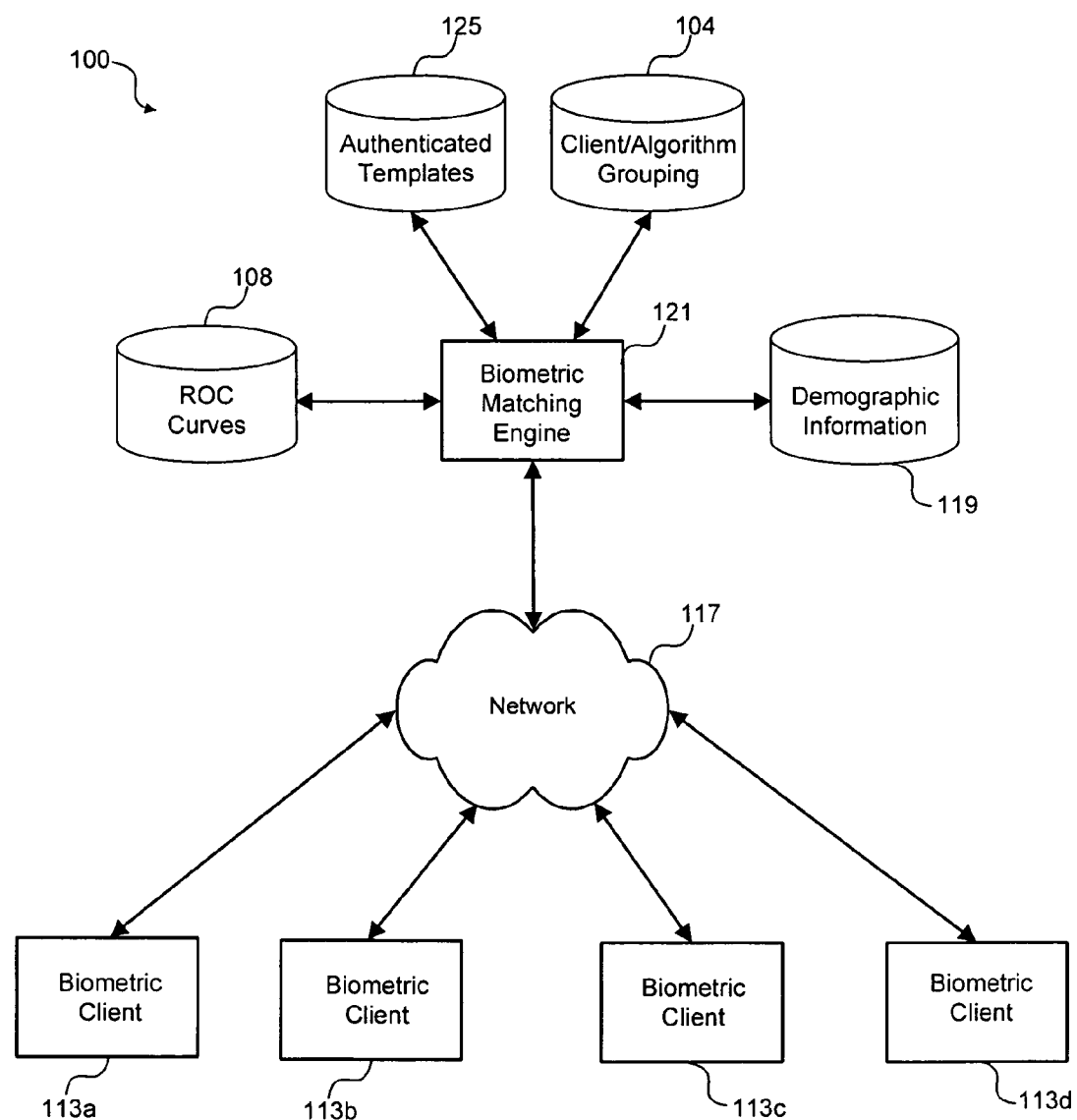
FIG. 1 is a block diagram of an embodiment of a biometric system.

In the appended figures, similar components and/or features may have the same reference label. Further, various components of the same type may be distinguished by following the reference label by a letter that distinguishes among the similar components. If only the reference label is used in the specification, the description is applicable to any one of the similar components having the same reference label irrespective of the letter suffix.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, a method for multimodal biometric analysis allows aggregating measured biometric readings from two or more biometric readers in a meaningful way. Each biometric reader takes biometric readings and produces a proprietary score indicating the likelihood for a match according to a proprietary scale. Scores produced by proprietary biometric algorithms are themselves unique and not standardized. Scores from one biometric algorithm may be in the range from 0 to 10,000 while scores from another biometric algorithm may be in the range of 50 to 100. While the proprietary scores in a single mode operation are meaningful in the sense that, with underlying knowledge they can be used to determine whether a score signifies a match, they are in a sense arbitrary. In order to combine scores and produce meaningful multimodal results according to the present invention, there are provided processes for normalizing or otherwise combining the scores.

One way to combine the proprietary scores normalizes each proprietary score to a common scale using a normal distribution. The threshold is also normalized to the new scale. The normalized scores from the various algorithms are combined through an average or weighted average to achieve a composite score. The proprietary thresholds for each biometric reader/algorithm could be normalized and combined with an average or weighted average to form a composite threshold. A composite threshold is used to perform the final authentication against the composite score.

The proprietary threshold is conventionally set for a biometric reader/algorithm combination such that a proprietary score above that number would indicate a match (i.e., authentic user) and a proprietary score below that number would indicate no match (i.e., user not authentic). For example, a fingerprint reader/algorithm might compare a probe template against an authentic template to indicate a 4,000 proprietary score for a particular scan on a proprietary scale from zero to 5,000. If the proprietary threshold were 4,500, the biometric reader/algorithm combination would indicate that person didn't match. If the proprietary threshold were 4,000, the opposite would be true.

A statistical distribution could be based upon past authentication results in a test population or could dynamically use new readings to update the statistical distribution. In this embodiment, a receiver operating characteristic (ROC) curve for this statistical distribution could be dynamically updated as more authentication results are gathered. As the biometric reader or client, the environment, the population of users, the experience level of the users all change so would the ROC curve. One embodiment of this invention gathers all the scores for a particular biometric reader and particular biometric matching algorithm to form a statistical distribution in the form of the ROC curve. For a particular biometric matching algorithm, this ROC curve could be from a single biometric reader/algorithm combination, a subset of the same biometric readers/algorithms, or all biometric readers/algorithms that are the same. The new gathered readings could be culled by geography, location, lighting, training level of users, organization, or other demographics or conditions to control the population used in a particular ROC curve.

Some embodiments further control what readings are part of the analysis for the ROC curve statistical distribution. The period over which the statistical distribution could be chosen in various embodiments, for example. Alternatively, the number of readings used in the statistical distribution could be capped, for example, only using the most recent 5,000 readings. Yet another embodiment could weight the readings such that newer readings were favored over older readings using an infinite impulse response (IIR) or finite impulse response (FIR) filtering algorithm. Combinations of theses approaches are also possible to properly emphasize the best readings.

Using the evolving ROC curve in this embodiment, new scores are determined that are normalized according to the ROC curve. For example, the 4,000 proprietary score for a particular scan could be scaled to a normalized 80% score based upon the statistical distribution of the ROC curve. Each normalized score from two or more biometric reader/algorithm pairs is normalized before averaging together each of the normalized scores to get a composite biometric score. A composite threshold is compared with the composite biometric score to determine if there is a match. For example, a first normalized score might be 89% from a fingerprint reader and a second normalized score might be 67% from a face scanner. The composite biometric score from averaging the two would be 78%. If the composite threshold were 70%, a match would be determined. Other algorithms for normalizing the scores could be used in other embodiments.

Instead of a strait average, the average could be weighted according to the accuracy of a particular biometric reader and biometric matching algorithm. For example, if a fingerprint reader were more accurate, its normalized score would be more heavily weighted than normalized score from a face scanner. Normalized thresholds could be similarly weighted for their averaging when formulating the composite threshold.

There are other embodiments that use other algorithms to correct for variations in the ROC curve statistical distribution. For example, each ROC curve for each biometric reader/algorithm pair could be normalized against the ROC curves for the other biometric scans that are used to authenticate a user. Each ROC curve could be normalized to have the same normalized threshold, for example.

Referring initially to FIG. 1, a block diagram of an embodiment of a biometric system 100 is shown. This embodiment shows four different biometric clients 113 coupled with a network 117 to a biometric matching engine 121. The network 117 is packet switched in this embodiment, but other embodiments could directly couple the biometric clients 113 to the biometric matching engine 121. Other embodiments could have any number of biometric clients 113 and biometric matching engines 121.

Each biometric client 113 gathers two or more biometric scans from a user. The user may identify himself or herself generally or specifically when interacting with the biometric client 113. Where the user alleges an identity with a bar code, RFID tag, login, etc., that identity is passed to the biometric matching engine 121. The biometric client 113 may serve any authentication purpose, for example, an access point, a computer login, a point-of-sale (POS) terminal, a safe, or other authentication point. In various embodiments, biometric clients 113 support scanning biometrics from 2D face, 3D face, iris, retina, finger vein, palm vein, single fingerprint, LiveScan fingerprints, PalmScan of the flat of a palm, writers palm, hand geometry, dental records, signature, voice, nuclear DNA, mitochondrial DNA, keystroke, gait, smell, and/or any other biometric that can be digitized. One embodiment supports as many as 93 different biometric capture devices that might be used in various deployments.

The biometric matching engine 121 has algorithms to process biometric scans from the biometric clients 113. The biometric algorithms could be commercially available and embedded into the biometric matching engine 121. There could be a single algorithm for each type of captured scan or could have multiple algorithms available for each type of captured scan. Different algorithms for a particular biometric scanner hardware produces a different scoring for the same input. In one embodiment, 65 algorithms are supported in various biometric matching engines.

A given pairing of a type of biometric scanner hardware and biometric algorithm may produce differing results. The biometric clients 113 may be deployed in different areas with various environments that could affect readings. For example, a facial scanner in daylight could result in a different ROC curve than one in poor lighting. Similar client/algorithm pairs are grouped together in a client/algorithm grouping database 104. Grouped client/algorithms allow all those in the group to contribute readings to the same genuine and imposter ROC curves. The scores allow determining the genuine and imposter ROC curves that are stored in the ROC curve database 108.

During the enrollment process, all users provide some demographic information in this embodiment. The demographic information database 119 holds information for each user. For example, address, phone number, height, weight, sex, experience level in using biometric client 113, etc. could be stored in the demographic information database 119. Additionally, information that might affect a biometric scan is stored in the demographic information database 119. For example, a user with a scarred fingerprint may have the scarred status stored in the demographic information database 119. Also, information on the biometric clients 113 may be store din the demographic information database 119.

During enrollment, biometric scans are gathered for each user along with any demographic information. An authenticated template database 125 of this embodiment stores a template produced by the biometric matching engine 121. A given user would have one or more authenticated templates for each type of biometric that might be encountered.

Additional probe templates may be added to the template database 125 during normal operation if there is a reasonable certainty that the user's scans are authentic.

The ROC curve database 108 can be updated with the results from an authentication attempt. The ROC curves are stored in the ROC curve database 108. Failed authentications are recorded in an imposter ROC and successful ones are recorded in a genuine ROC. Each grouping of client/algorithm have their own imposter and genuine ROC curves stored in the ROC curve database 108. The statistical distribution of the ROC curve is used in normalizing any new score.

Figure 2:
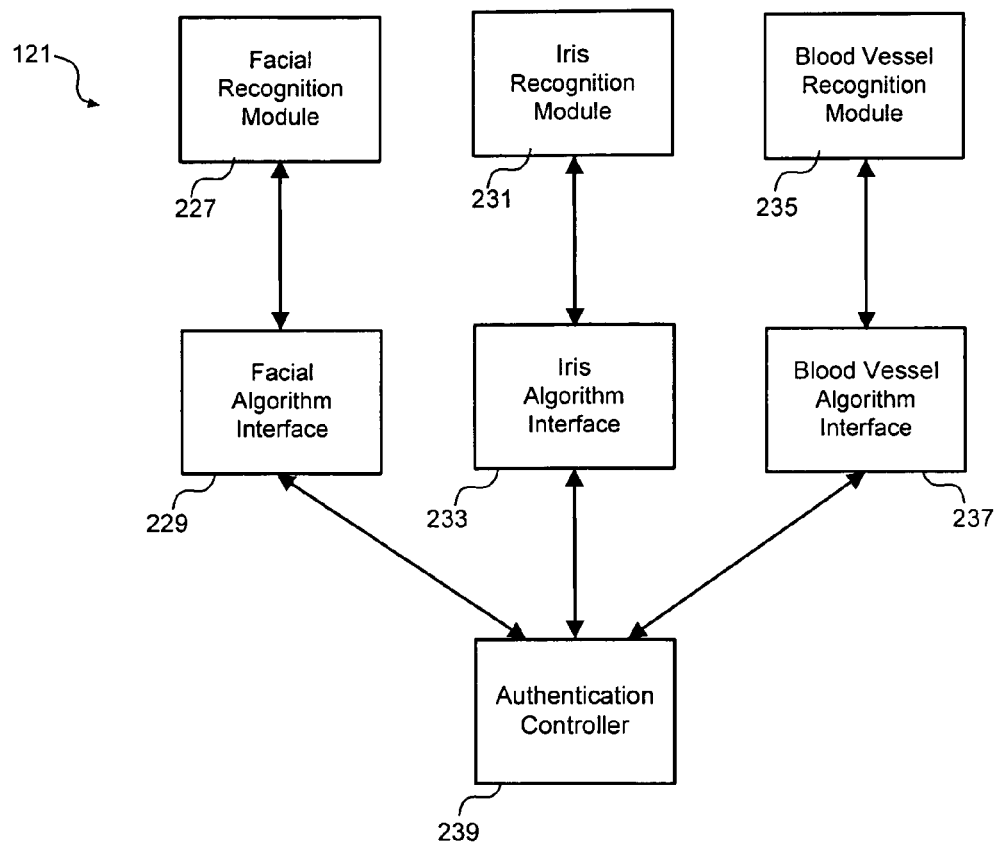
FIG. 2 is a block diagram of an embodiment of a biometric matching engine.

With reference to FIG. 2, a block diagram of an embodiment of the biometric matching engine 121 is shown. This embodiment has three recognition modules 227, 231, 235 that each include an algorithm for scoring probe templates against authenticated templates 125. For example, this embodiment includes a facial recognition module 227, an iris recognition module 231 and a blood vessel recognition module 235. Some embodiments could have two or more different recognition modules for a particular biometric that use the same or different algorithms. For example, there could be five iris recognition modules 227 that run in parallel with the same algorithm to increase the speed at which irises can be analyzed. In another example, there are two facial recognition modules 227 that each use a different algorithm. Running a fingerprint scan through both algorithms may produce more accurate results when the scores are normalized and combined.

The recognition modules 227, 231, 235 a typically provided as software development kits (SDKs) from third parties. Integration of a recognition module 227, 231, 235 into the biometric matching engine 121 uses an algorithm interface 229, 233, 237. Any translations, interface requirements and normalizations are handled by the algorithm interface. The ROC curves 108 are available to the algorithm interfaces 229, 233, 237 to allow providing a normalized score for each result produced by the recognition module 227, 231, 235. The algorithm interfaces 229, 233, 237 could use any number of normalization algorithms, for example, min-max, z-score, normal distribution probability and/or hyperbolic tangent method (i.e., tan h).

The interaction between the recognition modules 227, 231, 235 and algorithm interfaces 229, 233, 237 is illustrated in the following example. The facial algorithm interface 229 receives a face scan and may do some processing to comply with format requirements of the face recognition module 227. The facial algorithm interface 229 indicates the set of authenticated templates 125 that should be tested against the probe template produced by the facial recognition module 227. The facial recognition module 227 produces a proprietary score for each authenticated template 125 in the set. Those proprietary scores are processed to produce normalized scores. Some embodiments cull or prune lower scores that are unlikely to be part of the genuine ROC curve before producing a normalized score. The pruning may be done in the algorithm interface 229, 233, 237 or the authentication controller 239.

Normalized scores are provided to the authentication controller 239 by each of the algorithm interfaces 229, 233, 237 used for a particular authentication. The authentication controller 239 gathers all these normalized scores to produce a composite score for various persons that might be authenticated to the user. Various recognition modules may have a proprietary threshold that varies over time. That proprietary threshold can be normalized and used to produce a composite threshold. The normalized scores are combined in an average or a weighted average process to form a composite score and tested against the composite threshold. A processor, memory and program code may be used to implement the authentication controller 239.

Those users that are authenticated to a person or not are communicated to the facial algorithm interfaces 229, 233, 237 such that the genuine and imposter ROC curves for each client/algorithm grouping can be updated. The person that is authenticated to the user has their score added to the genuine ROC curve, and the persons that are not matched to the user have their scores added to the imposter ROC curve.

Figure 3:
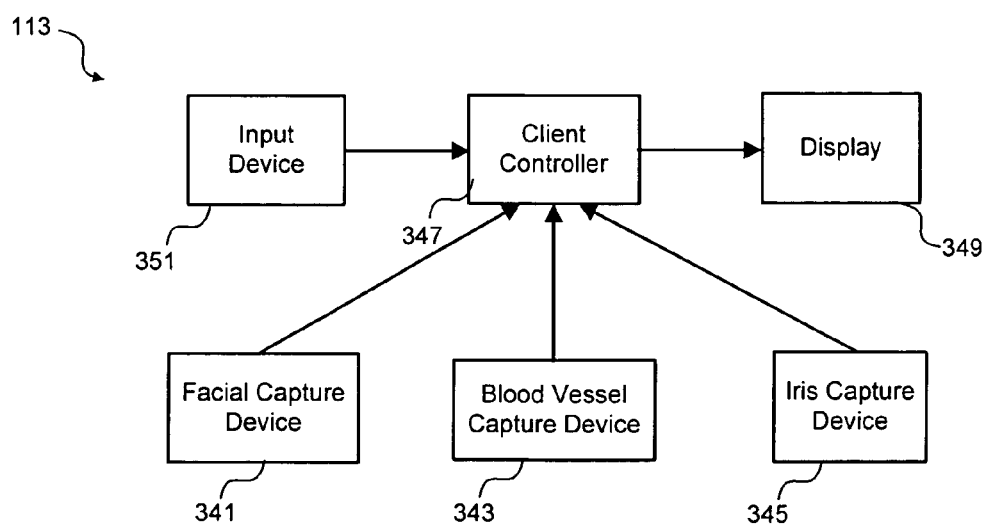
FIG. 3 is block diagram of an embodiment of a biometric client.

Referring next to FIG. 3, a block diagram of an embodiment of the biometric client 113 is shown. Biometric clients 113 come in many different configurations and may support different biometric scanning. In this embodiment, there are a facial capture device 341, a blood vessel capture device 343 and an iris capture device 345 that scan a user to gather biometric information. The facial capture device 341 could be a video or still camera. The blood vessel capture device 343 could be a infrared sensitive camera that views blood vessels on the face, hand and/or arm. The iris image capture device 345 could be a video or still camera. In one embodiment, a single video camera sensitive to infrared is used to capture the face, blood vessels and iris.

An optional input device 351 can be used in some embodiments. The input device could include a keypad, a card scanner, soft menus, voice interface, and/or other input mechanisms. The keypad could be used to enter a secret code or perform a login. The card scanner could read a bar code, magnetic stripe, RFID tag, optical card reader, and/or any other mechanism to machine-recognize an alleged identity of the user. The alleged identity is used to narrow the number of authenticated templates to test against the probe template gathered from the user.

An optional display 349 is included in this embodiment. The display 349 can be a screen with instructions or as simple as status lights. The display 349 provides feedback to aid the user in scanning his or her biometrics. This embodiment uses a multi-line LCD for the display 349.

The operations of the biometric client 113 is regulated by the client controller 347. A processor, memory and program code is used to implement the client controller 347 in this embodiment. The client controller 347 communicates through the network 117 to the biometric matching engine. Some embodiments of the biometric client 113 may be able to take environmental readings to allow picking ROC curves most similar. For example, lighting or temperature might be monitored and reported to the biometric matching engine 121 who can adjust the client/algorithm grouping accordingly.

This embodiment gathers biometrics live, but other embodiments could work with biometrics that were previously gathered. For example, there could be a large database of biometrics that are processed long after they are gathered.

Figure 4:
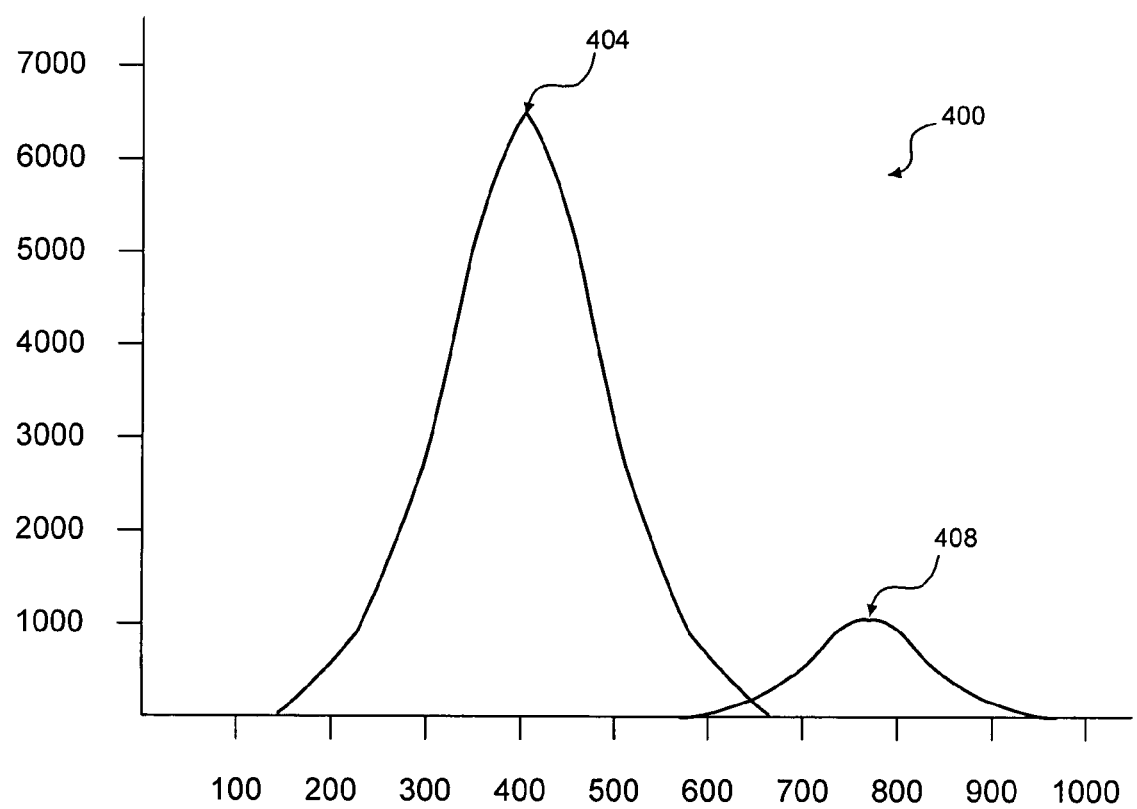
FIG. 4 is a plot of distributions of imposter and genuine receiver operating characteristic (ROC) curves.

With reference to FIG. 4, a plot 400 of distributions of imposter and genuine ROC curves 404, 408 is shown. The imposter ROC curve 404 takes the proprietary scores from all scans deemed to not authenticate to update prior readings. Similarly, the genuine ROC curve 408 takes all the proprietary scores deemed to be authentic to update prior readings. In this embodiment, the proprietary scores from the recognition module 227, 231, 235 range from zero to one thousand.

This embodiment shows some overlap in the range of 590 through 660 between the imposter and genuine ROC curves 404, 408 where it is unclear if a proprietary score corresponds to a match between the user and a person or not. For this area, the composite authentication determination can be used to determine the proper category a given score should be given. Any proprietary score can be normalized to the ROC curves to get a normalized score that is a percentile in this embodiment, but any scoring scale could be used in other embodiments.

For new deployments, seed ROC curves 404, 408 are generated for each group of client algorithm 104. Known good datasets are run through the client/algorithm combinations to generate the seed ROC curves 404, 408. In some cases, the conditions used to gather the biometrics in the dataset are known, such that they can be matched to pick the best biometrics to generate the see ROC curves 404, 408. For example, for a low-light deployment of a biometric client, those in the dataset captured in low-light could be used. In another example, it might be noted the likely eye color of the population of users based upon geography of the biometric clients, such that a dataset of similar eye colors can be formulated to generate the seed ROC curves 404, 408. ROC curves 404, 408 will evolve over time as new scores are added to customize the curves 404, 408 for the conditions in the group. Some embodiments may have a separate set of ROC curves 404, 408 for each client/algorithm combination.

Figure 5:
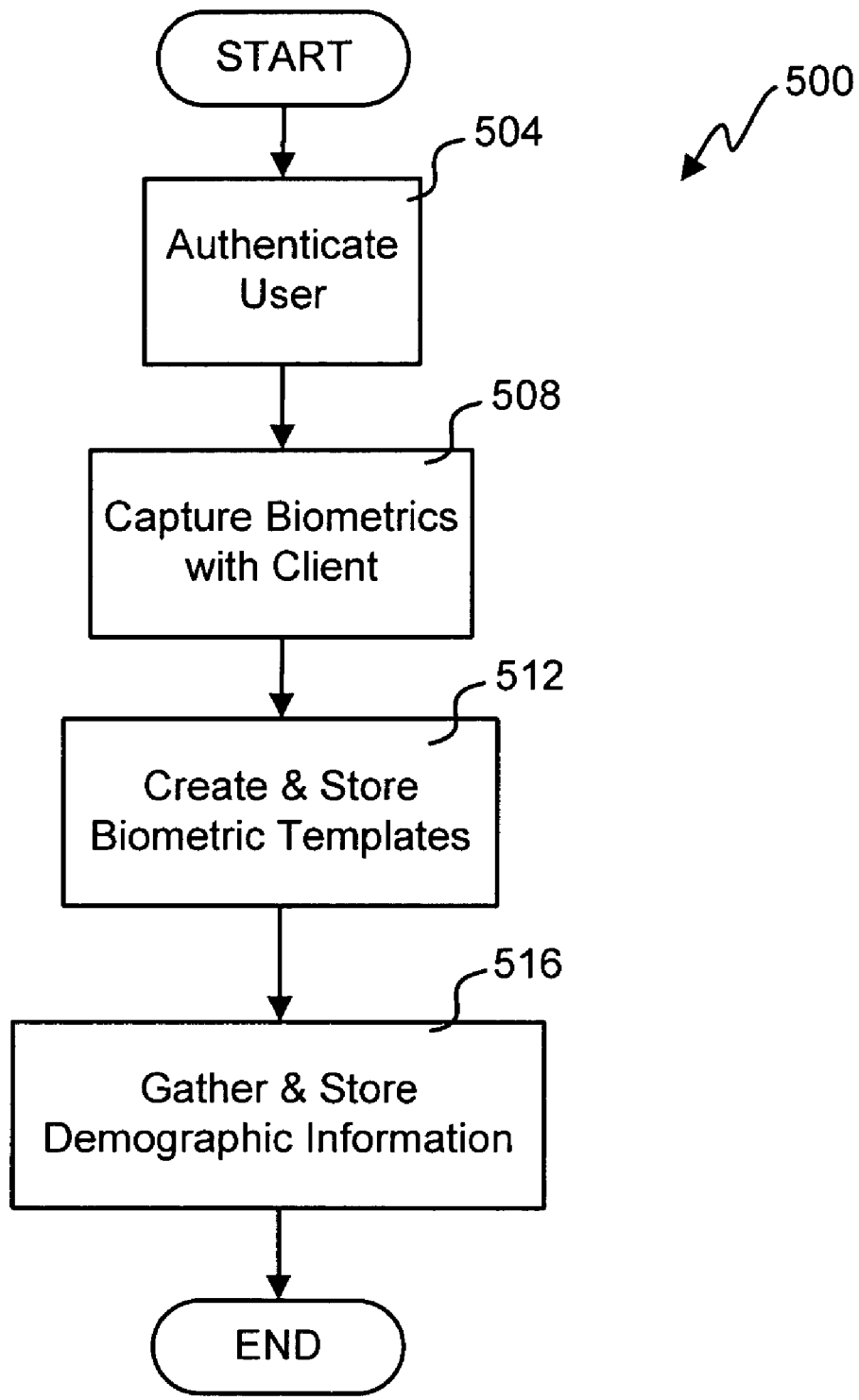
FIG. 5 is a flowchart of an embodiment of biometric matching engine enrollment process.

Referring next to FIG. 5, a flowchart of an embodiment of biometric matching engine enrollment process 500 is shown. The depicted portion of the process begins in block 504 where the user is authenticated. Typically, this is done manually by convincing an administrator that the user is actually who he or she alleges to be. Next, the various biometrics are captured in block 508. This may involve working with different configurations of biometric clients in different environmental conditions. For example, there may be two variations of facial capture devices 341 and an authenticated template may be gathered for each variation. At the end of block 508, all the client/algorithm variations the user might encounter have at least one authenticated template 125 created and stored in block 512. Any demographic information on the user that could affect the client/algorithm pairs is gathered in block 516 and stored in the demographic information database 119.

With reference to FIG. 6A, an embodiment of a flowchart for a biometric matching process 600a is shown. This embodiment knows an alleged identity of the user based upon a reading made by the input device 351 of the biometric client 113, for example. The depicted portion of the process begins in block 604 where seed imposter and genuine ROC curves 404, 408 are formulated according to demographics and environmental conditions. This might include processing latent biometrics of a similar demography through the client/algorithm pairs to generate the ROC curves 404,408. Once configured, users can interact with the one or more biometric clients 113 to perform the various authentications. An authentication is initiated in block 608.

The user alleges an identity with a scan of an identity card in block 612. This embodiment gathers and processes biometric scans in parallel, but blocks 616, 620, 624 could be done sequentially also or partially in parallel. In blocks 616a and 616b, the biometric scans are captured by the biometric client 113 and probe templates are created by the relevant recognition modules 227, 231, 235. This embodiment gathers biometrics during the live process, but other embodiments could process previously-stored latent biometrics. In this embodiment, there are two biometrics used in the process 600, but other embodiments could use any number of biometrics in the authentication process. The recognition modules 231 each check the probe template against the authenticated template for the user to generate a proprietary score in blocks 620a and 620b.

The proprietary scores are processed by the algorithm interfaces 229, 233, 237 to create normalized scores in blocks 624a and 624b. This involves reference to the genuine ROC curves 408 for those client/algorithm groups involved for this process 600a. Block 628 combines the normalized scores into a composite score using an average function, for example. A composite threshold is used in block 632 to determine if the composite score is above or below a composite threshold. If above, the user is authenticated and authorized in block 640. For those below, there is no authorization. In block 644, the genuine and imposter ROC curves are updated for each client/algorithm pair.

Figure 6B:
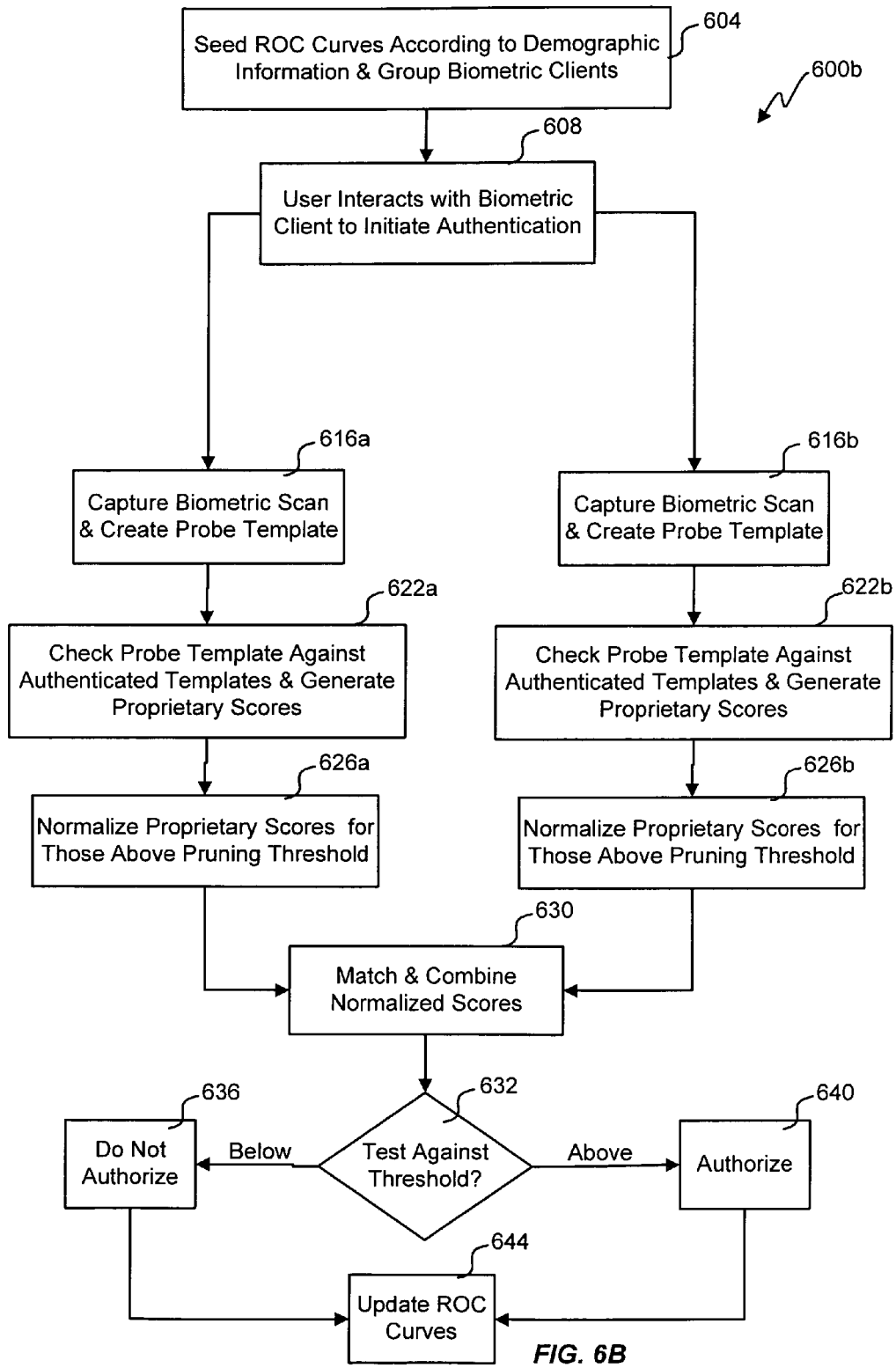

Referring next to FIG. 6B, another embodiment of a flowchart for a biometric matching process 600b is shown. This embodiment does a general authentication where the user does not allege an identity. Blocks 604, 608, 616a and 616b at the beginning of the process 600b and blocks 632, 636, 640, and 644 largely operate as with the embodiment of FIG. 6B. The following discussion focuses on those differences.

In blocks 622a and 622b, the gathered probe templates are checked against the authenticated templates 125 for persons that they might match. Each possible person for each possible client/algorithm will generate a proprietary score the by the relevant recognition module 227, 231, 235. Block 626a and 626b perform pruning of those proprietary scores not likely to be genuine. For example, for the statistical distribution of FIG. 4, those scores below 590 would be excluded from further analysis unless there is no match, in which case, the pruning threshold could be lowered. Those proprietary scores above the pruning threshold are normalized.

Some embodiments could communicate the persons above the pruning threshold such that all the persons that have one biometric above the pruning threshold for a particular client/algorithm pair could be further considered. For example, a particular user may give an iris scan and a fingerprint scan, but the fingerprint scan could have been collected poorly. A low score for the fingerprint and a high score could still result in a composite score high enough even though the fingerprint score were below the pruning threshold. Normalized scores are produced for the set of persons that have any proprietary score above its corresponding pruning threshold.

In block 630, the possible genuine composite scores are generated. All possible persons will have a composite score generated. All those composite scores are tested in block 632 to authenticate the user to a single person. Where there are more than one person that passes, the best one could be matched or an error condition could occur. It could be likely that there are two persons that are the same if there are two that pass the threshold test and the databases could be corrected accordingly. In other cases, a match of the user to one or more persons is all that is required because presumably the user is authorized given at least one match.

A number of variations and modifications of the disclosed embodiments can also be used. For example, many of the above embodiments contemplate the invention being used for authorization purposes. Other embodiments could match persons for any purpose. For example, a system might try to match users to a person on a watch list or try to find duplicate records where one person has two identities. Some of the above embodiments work with two biometric scans when producing a composite score, but it is to be understood that three, four, five, six, seven or any number of biometric scans could be combined in producing the composite score in various embodiments.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques described above may be done in various ways. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A biometric system that uses readings from a plurality of biometrics of a user, comprising:
    a first biometric reader delivering a first measured biometric;
    a first biometric matching engine, wherein:
    the first biometric matching engine processes the first measured biometric to produce a first value,
    the first value is indicative of a likelihood that the first measured biometric matches a first stored biometric reading, and
    a plurality of first values are gathered prior to the first value;
    a second biometric reader delivering a second measured biometric;
    a second biometric matching engine, wherein:
    the second biometric matching engine processes the second measured biometric to produce a second value,
    the second value is indicative of a likelihood that the second measured biometric matches a second stored biometric reading,
    a plurality of second values are gathered prior to the second value, and
    at least one of:
    the first and second biometric readers measure a different biometric, or
    the first and second biometric matching engines use a different algorithm; and
    a processor that:
    normalizes the first value according to the plurality of first values,
    normalizes the second value according to the plurality of second values, and
    determines if the user is matches to a person using the normalized first and second values.

2. The biometric system that uses readings from the plurality of biometrics of the user as recited in claim 1, a first threshold is chosen based, at least in part, on the plurality of first values gathered previously by the first biometric reader and the first biometric matching engine.

3. The biometric system that uses readings from the plurality of biometrics of the user as recited in claim 2, wherein the first threshold is normalized.

4. The biometric system that uses readings from the plurality of biometrics of the user as recited in claim 3, wherein the second threshold is normalized.

5. The biometric system that uses readings from the plurality of biometrics of the user as recited in claim 3, wherein the first and second threshold are combined to find a combined threshold.

6. The biometric system that uses readings from the plurality of biometrics of the user as recited in claim 2, a second threshold is chosen based, at least in part, on the plurality of second values gathered previously by the second biometric reader and the second biometric matching engine.

7. The biometric system that uses readings from the plurality of biometrics of the user as recited in claim 1, wherein a first biometric matching engine algorithm updates as the first value is added to the plurality of first values.

8. The biometric system that uses readings from the plurality of biometrics of the user as recited in claim 1, wherein the first biometric reader retrieves from storage the first measured biometric.

9. A method for increasing accuracy of a biometric matching over time, the method comprising:
   gathering a first plurality of biometrics;
   matching a first measured biometric with the first plurality of biometrics to produce a first result, wherein:
      the first result is indicative of a likelihood that the first measured biometric matches at least one of the first plurality of biometrics, and
      the first measured biometric is a different type of biometric than the second measured biometric;
   gathering a second plurality of biometrics;
   matching a second measured biometric with the second plurality of biometrics to produce a second result, wherein:
      the first-listed matching step uses a different algorithm from the second-listed matching step, and
      the second result is indicative of a likelihood that the second measured biometric matches at least one of the second plurality of biometrics;
   combining the first and second results in a normalizing process;
   matching a user to a person using a result from the normalizing process; and
   adding the first result to a plurality of first results.

10. The method for increasing accuracy of the biometric authentication over time as recited in claim 9, wherein the first and second measured biometrics are gathered from the user.

11. The method for increasing accuracy of the biometric authentication over time as recited in claim 9, wherein the first plurality of biometrics is gathered from a plurality of biometric readers.

12. The method for increasing accuracy of the biometric authentication over time as recited in claim 9, further comprising a step of adding the second measured biometric to the second plurality of biometrics, whereby a biometric match algorithm of the second-listed matching step improves over time.

13. The method for increasing accuracy of the biometric authentication over time as recited in claim 9, wherein the gathering step comprises a step of latently gathering the first plurality of biometrics, which were previously captured and stored.

14. The method for increasing accuracy of the biometric authentication over time as recited in claim 9, further comprising a step of adding the second value to the plurality of second values after the authenticating step.

15. The method for increasing accuracy of the biometric authentication over time as recited in claim 9, further comprising a step of recalibrating performance of the first-listed matching step with the first measured biometric.

16. A biometric system that uses readings from a plurality of biometrics of a user to authenticate the user, comprising:
   a first biometric reader producing a first measured biometric from the user;
   a first biometric matching engine, wherein:
      the first biometric matching engine processes the first measured biometric to produce a first value, and
      the first value is indicative of a likelihood that the first measured biometric matches a first stored biometric reading;
   a second biometric reader producing a second measured biometric from the user;
   a second biometric matching engine, wherein:
      the second biometric matching engine processes the second measured biometric to produce a second value,
      the second value is indicative of a likelihood that the second measured biometric matches a second stored biometric reading, and
      at least one of:
   the first and second biometric readers measure a different biometric, or
   the first and second biometric matching engines use a different algorithm; and
   a processor that:
      adjusts the first and second values to use a common scale, and
      determines if the user is authentic using the adjusted first and second values that use the common scale,
   wherein a first threshold is chosen based, at least in part, on a plurality of first values gathered with the first biometric reader and the fist biometric matching engine.

17. A biometric system that uses readings from a plurality of biometrics of a user to authenticate the user, comprising:
   a first biometric reader producing a first measured biometric from the user;
   a first biometric matching engine, wherein:
      the first biometric matching engine processes the first measured biometric to produce a first value, and
      the first value is indicative of a likelihood that the first measured biometric matches a first stored biometric reading;
   a second biometric reader producing a second measured biometric from the user;
   a second biometric matching engine, wherein:
      the second biometric matching engine processes the second measured biometric to produce a second value,
      the second value is indicative of a likelihood that the second measured biometric matches a second stored biometric reading, and
   at least one of:
   the first and second biometric readers measure a different biometric, or
   the first and second biometric matching engines use a different algorithm; and
   a processor that:
   adjusts the first and second values to use a common scale, and
   determines if the user is authentic using the adjusted first and second values that use the common scale,
   wherein the biometric system recalibrates as new first and second values are gathered over time.

18. A biometric system that uses readings from a plurality of biometrics of a user to authenticate the user, comprising:
   a first biometric reader producing a first measured biometric from the user;
   a first biometric matching engine, wherein:
   the first biometric matching engine processes the first measured biometric to produce a first value, and the first value is indicative of a likelihood that the first measured biometric matches a first stored biometric reading;

a second biometric reader producing a second measured biometric from the user;

a second biometric matching engine, wherein:

the second biometric matching engine processes the second measured biometric to produce a second value, the second value is indicative of a likelihood that the second measured biometric matches a second stored biometric reading, and at least one of:

the first and second biometric readers measure a different biometric, or the first and second biometric matching engines use a different algorithm; and a processor that:

adjusts the first and second values to use a common scale, and determines if the user is authentic using the adjusted first and second values that use the common scale, wherein the first biometric reader producing the first measured biometric by retrieving the first measured biometric from a data store where the first measured biometric was previously stored.

* * * * *